US006435993B1

United States Patent
Tada

(10) Patent No.: US 6,435,993 B1
(45) Date of Patent: Aug. 20, 2002

(54) HYDRAULIC CHAIN TENSIONER WITH VENT DEVICE AND PRESSURE RELIEF VALVE

(75) Inventor: Naosumi Tada, Nabari (JP)

(73) Assignee: BorgWarner Inc., Troy, MI (US)

( * ) Notice: Subject to any disclaimer, the term of this patent is extended or adjusted under 35 U.S.C. 154(b) by 17 days.

(21) Appl. No.: 09/599,822

(22) Filed: Jun. 21, 2000

(30) Foreign Application Priority Data

Jul. 5, 1999 (JP) .......................................... 11-189959

(51) Int. Cl.[7] .............................. F16H 7/08; F16H 7/22
(52) U.S. Cl. ...................................... 474/110; 474/109
(58) Field of Search ............................. 474/101, 109, 474/110

(56) References Cited

U.S. PATENT DOCUMENTS

| 5,346,436 A | 9/1994 | Hunter et al. ............... 474/101 |
| 5,700,213 A | 12/1997 | Sipson et al. ............... 474/110 |
| 5,707,309 A | 1/1998 | Simpson ....................... 474/110 |
| 5,879,256 A | 3/1999 | Tada ............................. 474/110 |
| 6,139,454 A | 10/2000 | Simpson ....................... 474/110 |
| 6,193,623 B1 * | 2/2001 | Kock et al. .................. 474/110 |

* cited by examiner

Primary Examiner—David A. Bucci
Assistant Examiner—Timothy McAnulty
(74) Attorney, Agent, or Firm—Sidley Austin Brown & Wood; Hugh A. Abrams

(57) ABSTRACT

A hydraulic chain tensioner comprises a hollow plunger slidably received within the bore of a housing. A spring pushes the plunger in the protruding direction, and a pressure relief valve assembly and an air vent disc that are integrally incorporated on the upper end at the tip of the plunger. The air vent disc has a disc shape including a first and second face. An outer periphery is formed with a through-hole. The outer diameter of the air vent disc is slightly smaller than the inner diameter of the plunger. The first face is formed with a spiral groove and the circumferential edge portion of the first face is formed with a radius. The starting end of groove is disposed at the radius and the terminal end of the groove is centrally located on the first face.

8 Claims, 5 Drawing Sheets

HYDRAULIC CHAIN TENSIONER WITH VENT DEVICE AND PRESSURE RELIEF VALVE

BACKGROUND OF THE INVENTION

The invention relates to a hydraulic chain tensioner for use with an associated chain or belt that drives an engine camshaft, balance shaft drive or the like. In particular, the hydraulic tensioner of the present invention is directed to an improvement of the construction of a hydraulic tensioner including a device to control the venting of air and fluids in cooperation with a device to provide pressure relief.

In general, a hydraulic tensioner includes a housing, a plunger inserted into a bore formed in the housing, and a spring that biases the plunger in the projecting or protruding direction. In the housing, a chamber is formed by assembling a hollow plunger into the bore of the housing. Oil is supplied to the chamber from an external oil pressure source. The pressurized oil acts on the plunger to cause the plunger to protrude from the housing bore and provide tension to an associated chain.

In a hydraulic tensioner, when air mixes with oil in the chamber, the plunger can be forced inwardly toward the housing due to compression of the mixed air and oil. The air/oil mixture compresses when the tension of the chain or belt increases and, as a result, the chain or belt tension can vary due to the reduced effectiveness of the tensioner.

A hydraulic tensioner, as disclosed in Japanese Laid-Open Patent No. 7-158703, discloses one proposed solution of such a problem. This hydraulic tensioner has a disc as a vent device inside the plunger. A spiral groove is formed on the disc surface. The starting end of the groove is located on the outer peripheral side of the disc surface and the terminal end is located at the center of the disc surface.

FIG. 6 is an enlargement showing the plunger tip part or upper end of the above hydraulic tensioner disclosed in the above patent publication. In the FIG., open hole 100a is formed at the tip of plunger 100 and disc 110 is inserted into hole 100b formed inside plunger 100. Spiral groove 110a is formed on one main surface (top surface) of disc 110 and groove 110b that extends in the direction of the center axis and connects the starting end to the terminal end of groove 110a and is formed on a part of the outer peripheral face of disc 110.

In such a hydraulic tensioner, the air mixed in the chamber passes through spiral groove 110a from groove 110b on the outer periphery of disc 110 and open hole 100a of plunger 100 and leaks out to the outside air together with hydraulic oil. At such times, excessive leaking of hydraulic oil in the chamber to the outside of the tensioner is suppressed because of the spiral shape of groove 110a on the main face of disc 110.

On the other hand, as shown in Laid-Open Patent Heisei 9-119490, a hydraulic tensioner with a vent that has a pressure relief valve, is also proposed. This pressure relief valve permits flow of fluid in the chamber, when the fluid pressure exceeds a set maximum value during operation, to reduce the fluid pressure in the chamber.

In the hydraulic tensioner of the above patent publication, an air vent disc is provided at the plunger tip and a pressure relief valve is provided on the bottom wall of the housing. When such hydraulic tensioner is assembled, the assembly of the air vent into the plunger and assembly of the pressure relief valve into the housing are separate processes and labor and cost increase.

The present invention eliminates this conventional problem and its objective is to offer a hydraulic tensioner with a reduced cost of assembly and smoothes the flow of air from the vent device.

SUMMARY OF THE INVENTION

It is a first object of the invention to provide a hydraulic tensioner including a housing with a bore that opens on one end and a hollow plunger that is slidably received by the bore. The plunger, or piston has a tip or upper end with an open hole or aperture and a spring that pushes biases the plunger in a protruding direction. A pressure relief valve assembly that permits the flow of fluid from the chamber under a present specific pressure condition, and a vent device is located inside of and at the tip of the plunger and is provided integrally with the pressure relief valve assembly. The vent device has a disc shape composed of first and second main surfaces that are opposite each other and an outer periphery surface located between those main surfaces. The outer diameter of the vent device is made slightly smaller than the inner diameter of the plunger. The vent has a through-hole that opens at the center of the first and second main surfaces, and a chamfer or radius is formed on the peripheral edge of the first main surface of the vent device. The starting end of the vent passage is located at the chamfer or radius and the terminal end of the vent passage is located at near center of the first main surface.

In the assembly of the hydraulic tensioner the second main surface of the vent device is placed opposite the pressure relief valve assembly and these components are inserted into the plunger, in which the vent device and the pressure relief valve assembly are integrally assembled. The first main surface, with a vent passage of the vent device, is opposite the plunger tip.

In this case, a vent device and pressure relief valve assembly, integrally assembled, are assembled into the plunger, so that one process can assemble these two components (i.e., at one station of the assembly machine) and thereby, labor and assembly costs can be reduced.

In operation air mixed into the chamber passes through the gap between the outer periphery of the vent device, the inner periphery of the plunger, and the chamfer or radius on the peripheral edge of the first main surface of the vent device, and flows into the starting end of the vent passage. Then the mixed-in air flows to the terminal end part vent passage and is discharged to the outside air from an open hole at the tip of the plunger.

In this case, mixed-in air flows toward the first main surface of the vent device by passing the optional position on the outer periphery of the vent device because a gap is formed between the outer periphery of the vent device and the inner wall or inner periphery of the plunger. The mixed-in air flows smoothly to the starting end of the vent passage past the chamfer or radius because the starting end of the vent passage is located at the chamfer on the peripheral edge of the first main surface of the vent device or the curved radius, and it flows outside the tensioner from the terminal end past the vent passages. In this manner, flow of the mixed-in air from the vent device is made smooth.

When pressure in the chamber becomes high, the fluid in the chamber flows out of the tensioner through the through-hole of the vent device and an open hole at the tip of the plunger, because of the pressure relief valve, thereby, abnormally high pressure in the chamber is prevented.

It is a second object of the invention to provide the hydraulic tensioner with an axial groove or notch that connects to the chamfer or radius formed on the outer periphery surface of the vent device. An axial groove or notch, that connects to the chamfer or radius, is formed on the outer periphery of the vent device. Therefore, the mixed-in air in the chamber moves to the first main surface of the vent device through the groove or notch during operation. Next, it flows to the starting end of the vent passage via the chamfer on the peripheral part or radius and is discharged out of the tensioner via the vent passage.

It is a third object of the invention to provide a circuitous vent passage that runs from the starting end to the terminal end so that the fluid flow from the chamber is restricted and the volume of leakage is suppressed.

It is a fourth object of the invention to provide a spiral vent passage.

It is a fifth object of the invention to provide the starting end of the vent passage tapered down toward its tip. The starting end of the vent passage is tapered down toward the tip, so that the flow of a large volume of fluid into the starting end of the vent passage is suppressed and the leakage flow can be limited.

It is a sixth object of the invention to provide a vent device urged toward the plunger tip by the spring. The vent device is urged toward the plunger tip by the spring so that, during assembly, the first main surface of the vent device contacts the inner wall at the plunger tip.

It is a seventh object of the invention to provide a further passage, for connection of the chamber to the external pressurized fluid source, the passage located inside the housing, so that the fluid from the external pressurized fluid source is supplied to the chamber via the passage.

It is an eighth object of the invention to provide a check valve that permits fluid to flow to the chamber and blocks the reversed flow of the fluid between the chamber and the passage so that the fluid flow to the chamber from the pressurized fluid source is permitted while its reverse flow is blocked.

For a more complete understanding of the invention, one should refer to the embodiments illustrated in greater detail in the drawings and described below by way of examples of the invention.

DETAILED DESCRIPTION OF THE PREFERRED EMBODIMENTS

Figure 1:
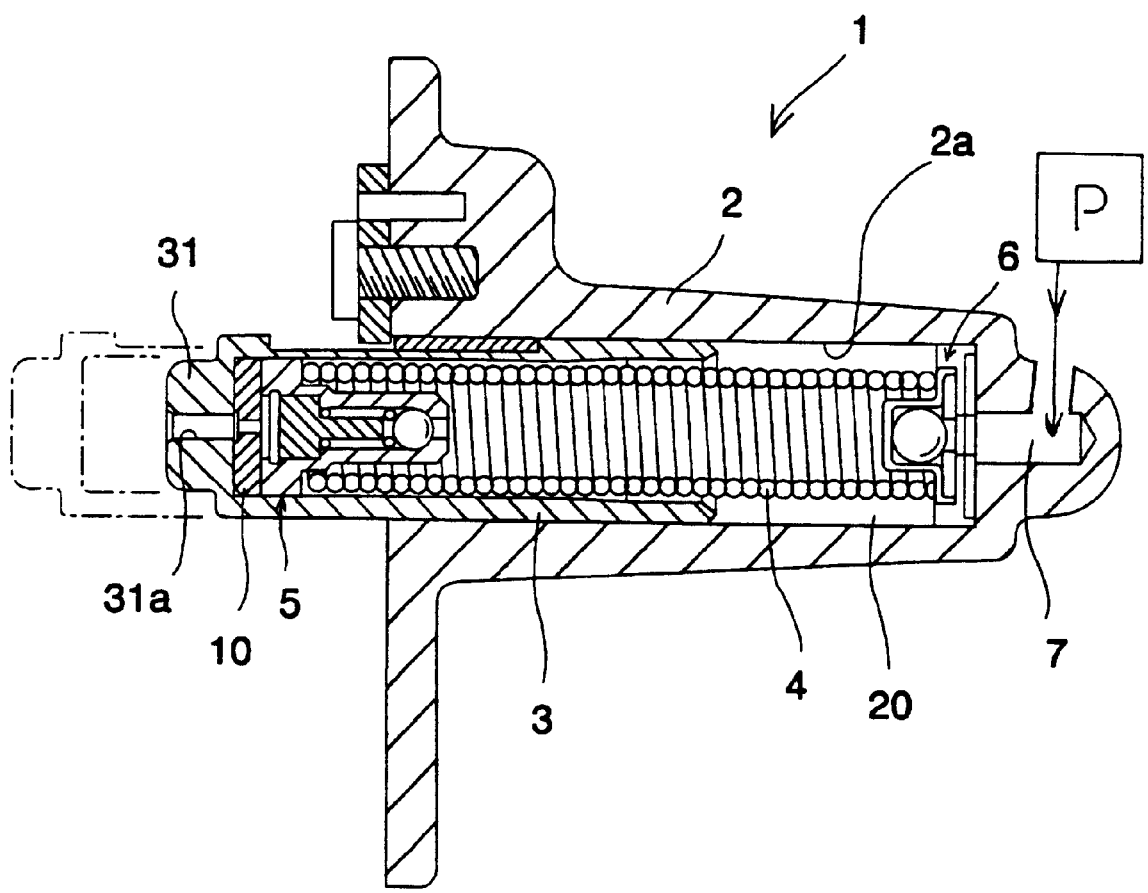
FIG. 1 is a cross-section of the hydraulic tensioner of the present invention.

As shown in FIG. 1, hydraulic tensioner 1 includes mainly housing 2, hollow plunger 3 inserted slidably into bore 2a of housing 2, and spring 4 that pushes plunger 3 toward its projection bore 2a.

A chamber 20 is formed in housing 2 by the inner wall of bore 2a and the inner wall of plunger 3. Open hole or aperture 31a is formed at the center of tip 31 of plunger 3 at the plunger upper end.

A ball check valve 6 is provided on the bottom wall of the chamber inside housing 2. This ball check valve 6 allows fluid to flow into chamber 20 and blocks its reverse flow. Housing 2 has a passage 7 to connect chamber 20 to the external pressurized fluid source P.

A pressure relief valve assembly 5 is provided on the side of tip 31 inside plunger 3. This pressure relief valve assembly 5 permits fluid to flow out from chamber 20 when the fluid pressure in chamber 20 exceeds a set maximum value. Air vent disc 10 is integrally assembled within pressure relief valve assembly 5. The force of spring 4 acts on plunger 3 via pressure relief valve 5 and air vent disc 10, and spring 4 causes plunger tip 31 to contact air vent disc 10.

Figure 2:
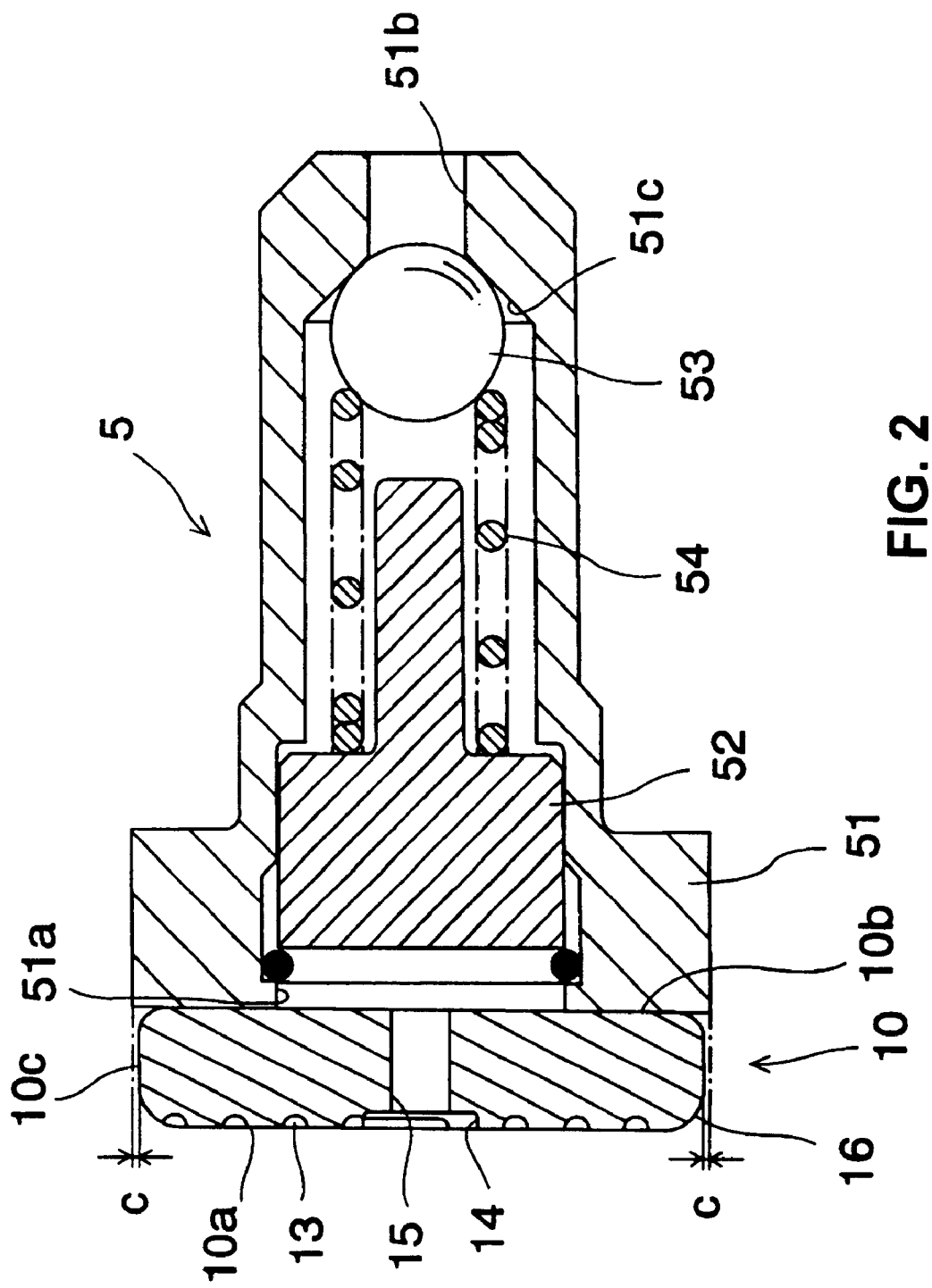
FIG. 2 is a partial enlargement of FIG. 1, showing an air vent disc and a pressure relief valve assembly.

FIG. 2 shows an enlargement of pressure relief valve assembly 5 and air vent disc 10. Pressure relief valve assembly 5 includes a valve housing 51 with open holes 51a, 51b on both of its ends. Plug member 52 is fixed in valve housing 51 and ball 53, that can contact seat 51c is formed in valve housing 51 and a valve spring 54 urges ball 53 onto seat 51c.

Figure 3:
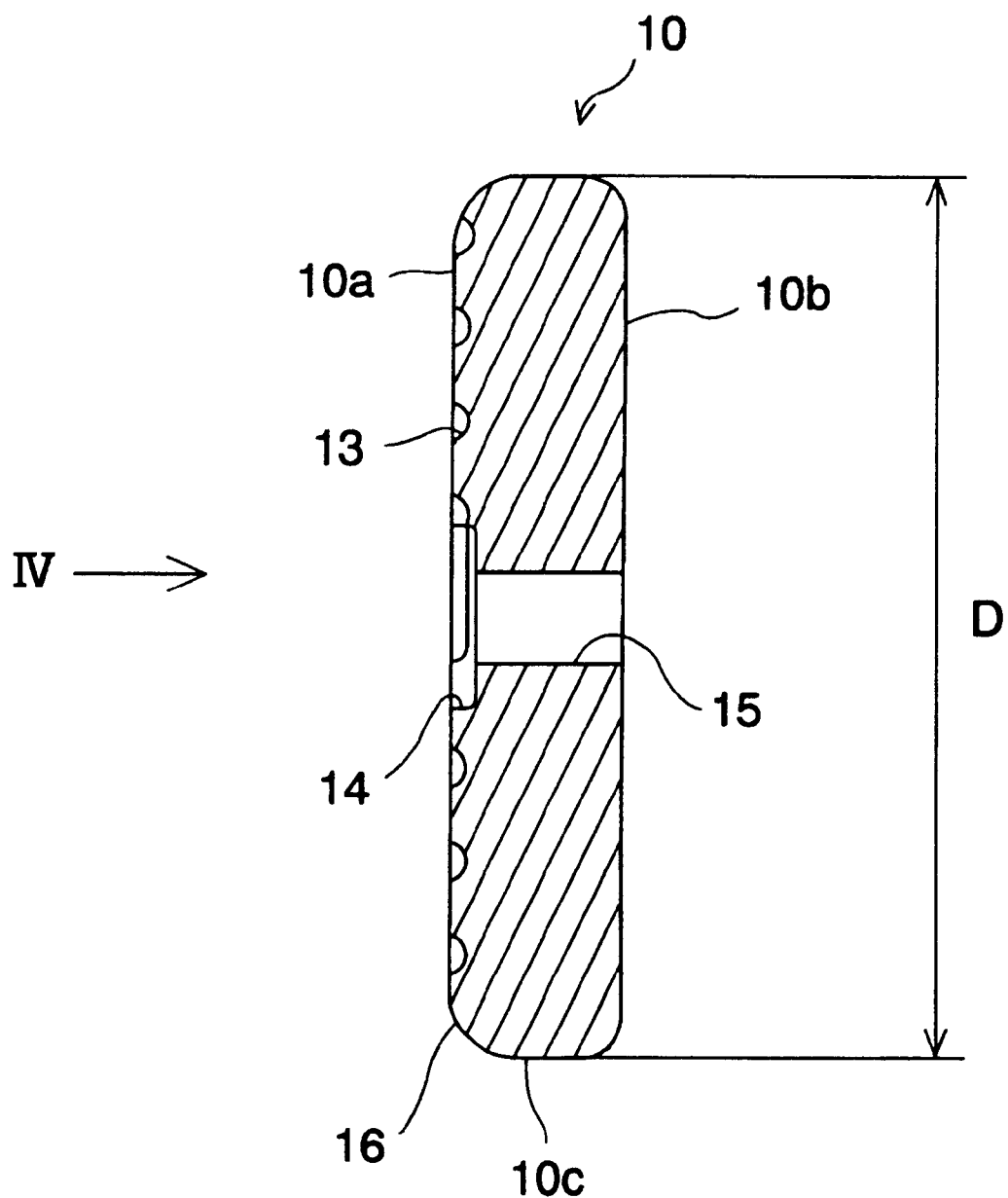
FIG. 3 is an enlarged cross-section of an air vent disc.

As shown in the enlargement in FIG. 3, air vent disc 10 is in the shape of a disc and is composed of first and second main surfaces 10a, 10b and outer periphery 10c. Curved radius 16 is formed on the peripheral edge of first main surface 10a. A chamfer with the same machining stock as said radius 16 can be formed in place of radius 16.

Figure 4:
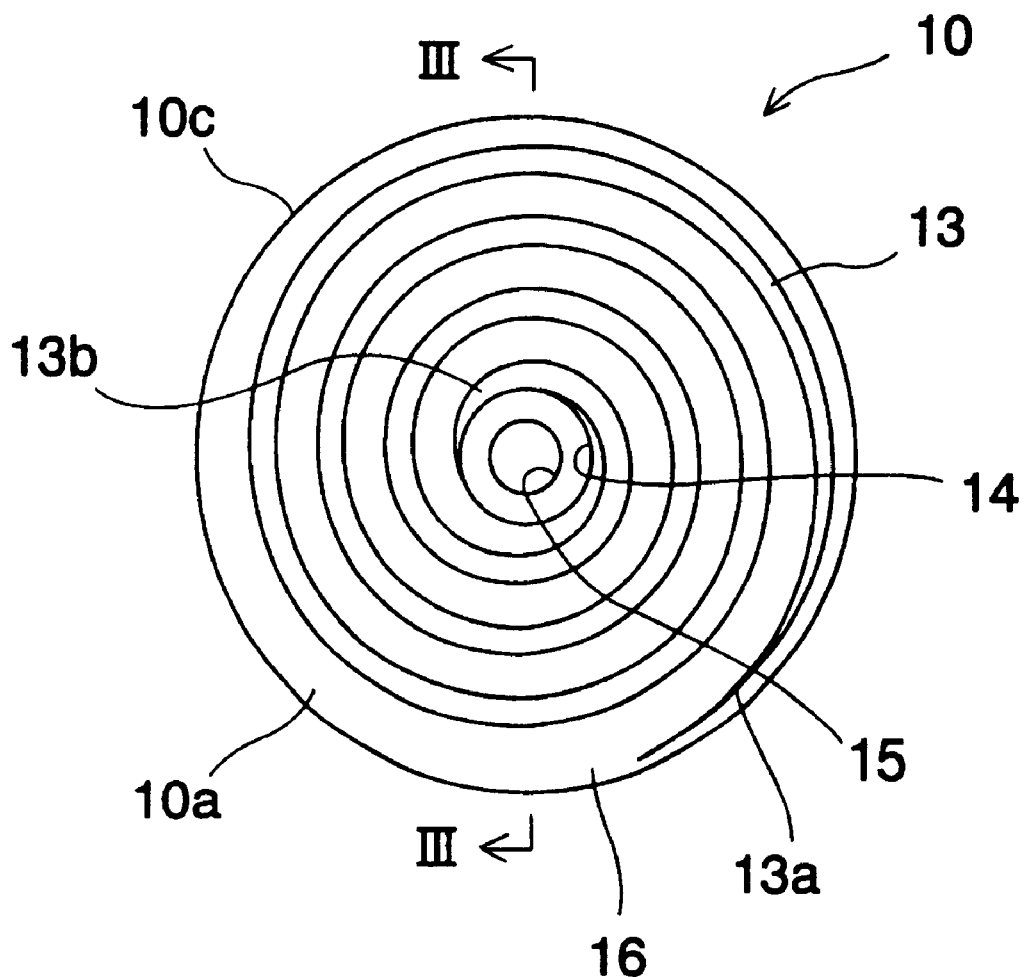
FIG. 4 is a sectional view through line IV—IV of FIG. 3.
Figure 5:
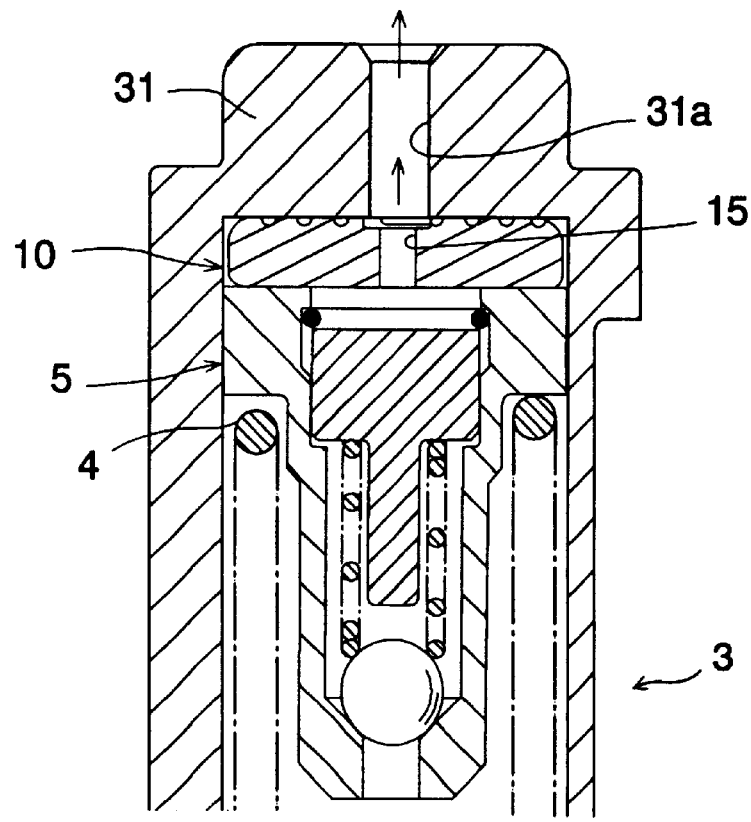
FIG. 5 illustrates the operation of an air vent disc.
Figure 6:
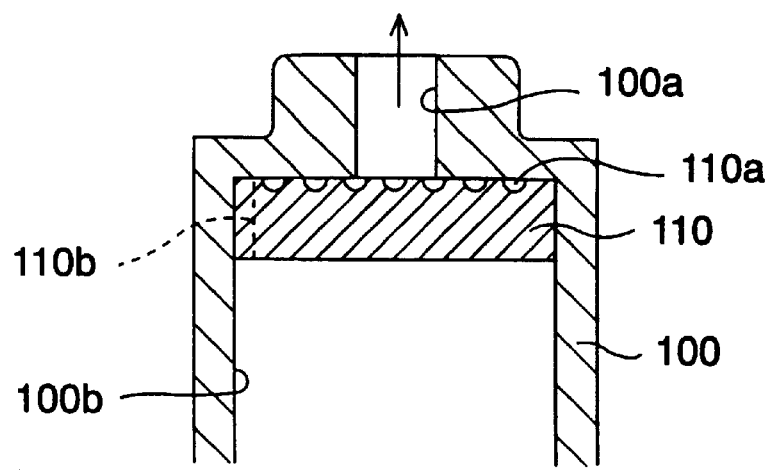
FIG. 6 is a partial enlargement of a conventional prior art hydraulic tensioner.

Spiral groove 13 is formed on the first main surface 10a as a vent channel (see FIG. 4). As shown in FIG. 4, starting end 13a of groove 13 is tapered down and its tip is positioned on radius 16. Terminal end 13b of groove 13 is connected to countersunk hole 14 formed at the center. Through-hole 15, connecting to countersunk hole 14, is formed at the center of air vent disc 10.

Outer diameter D (FIG. 3) of air vent disc 10 is slightly smaller than the hole diameter of plunger 3 and, as shown in FIG. 2, a clearance is formed between outer periphery 10c of air vent disc 10 and the inner wall of the plunger during assembly into plunger 3.

In the assembly of hydraulic tensioner 1, second main surface 10b of air vent disc 10 is opposite valve housing 51 of pressure relief valve assembly 5 and these components are inserted into plunger 3 while air vent disc 10 and pressure relief valve assembly 5 are assembled integrally. First main surface 10a with groove 13 of air vent disc 10 is opposite plunger tip 31.

Air vent disc 10 and pressure relief valve assembly 5 are integrally assembled inside the plunger, so that both can be assembled in one process (i.e., at one station of the assembly machine), thereby, the labor and assembly costs are reduced. Plunger 3 protrudes during operation of hydraulic tensioner 1 due to the combined force of spring 4 and the fluid pressure in chamber 20. The tip 31 of the plunger 3 contacts an associated chain (not shown) and applies tension to the chain, typically be bearing upon a tensioner arm or shoe (not shown). The inward force acting from the chain onto plunger 3 is balanced with the outward force due to spring 4 and the fluid pressure in chamber 20.

When the tension in the chain increases, the force, acting from the chain onto plunger 3 for its retraction, increases. When plunger 3 is pushed in the direction of retraction, the fluid pressure in chamber 20 increases. At the same time, the flow-out of fluid from chamber 20 is blocked by ball check valve 6. When the fluid pressure in chamber 20 exceeds a set maximum value, the valve in the pressure relief valve assembly 5 opens and allows flow-out of the fluid from chamber 20.

When the pressure relief valve assembly 5 is in active operation, ball 53 moves away from seat 51c against the force of valve spring 54 because of the action of fluid pressure in chamber 20. Then, the fluid in chamber 20 passes through between ball 53 and seat 51c and enters into valve housing 51 and further passes through between valve housing 51 and plug member 52, (not shown), and moves to the air vent disc 10 side and it passes through hole 15 and countersunk hole 14 of air vent disc 10 and flows out of the tensioner, past open hole 31a at plunger tip 31, and thereby the fluid pressure in the chamber 20 decreases.

When air mixes into the fluid in chamber 20, this mixed-in air passes through between the outer periphery of valve housing 51 of pressure relief valve assembly 5, the outer periphery 10c of air vent disc 10, and radius 16 formed on the peripheral edge of first main surface 10a of air vent disc 10, inner periphery of plunger 3, and it flows into starting end 13a of groove 13. The mixed-in air passes through groove 13 into its terminal end 13b and then it passes through open hole 31a at plunger tip 31 and is discharged to the outside air together with the fluid (hydraulic oil).

A gap is formed between outer periphery 10c of air vent disc 10 and the inner periphery of plunger 3. Therefore, the mixed-in air in chamber 20 passes through an optional position on outer periphery 10c of air vent disc 10 and flows into first main surface 10a of air vent disc 10. At such a time, the mixed-in air flows from radius 16 into starting end 13a of groove 13, smoothly, because starting end 13a of groove 13 is located at radius 16 formed on the peripheral edge of first main surface 10a of air vent disc 10 and the mixed-in air exit outside of the tensioner from terminal end 13b of groove 13. Thereby, the flow of mixed-in air from air vent disc 10 is made smooth.

Excessive leaking of fluid in chamber 20 is suppressed by spiral and circuitous groove 13 formed in main surface 10a of air vent disc 10 and the flow-in of a large quantity of fluid into starting end 13a of groove 13 is restricted by tapered-down starting end 13a of groove 13 (see FIG. 4). Thereby, the volume of leakage can be limited.

The axial groove or notch that connects to radius 16 can be formed on outer periphery 10c of air vent disc 10. In this case, the air mixed in into chamber 20 during operation passes through the groove or notch on the outer periphery 10c of air vent disc 10 and the radius 16 or peripheral edge of the first main surface 10a of air vent disc 10 and flows into starting end 13a of groove 13. The mixed-in air is discharged together with fluid (hydraulic oil) via groove 13, terminal end 13b and open hole 31a at plunger tip 31.

Furthermore, in the above embodiment, groove 13 as vent passage is in a spiral shape, but the shape of groove 13 is not limited to such a shape. Various circuitous paths are contemplated from its starting end to its terminal end.

As detailed above, in the hydraulic tensioner of this invention, a vent device and a pressure relief valve assembly are integral with a plunger, so that the assembly can be made in one process, for reduction of labor and assembly cost. Furthermore, a gap is formed between the outer periphery of the vent device and the inner periphery of the plunger and a chamfer or radius is formed on the peripheral edge of the first main surface of the vent device and the starting end of the vent passage is located at the chamfer or radius, so that mixed-in air in the chamber can flow smoothly to the starting end of the vent passage, past the chamfer or radius, and thereby, flow-out of mixed-in air from the vent device is smooth.

Although specific embodiments and examples have been disclosed herein, it should be borne in mind that these have been provided by way of explanation and illustration and the present invention is not limited thereby. Certainly modifications which are within the ordinary skill in the art are considered to lie within the scope of this invention as defined by the following claims.

What is claimed is:

1. A hydraulic chain tensioner comprising:
    a housing having a bore;
    a hollow plunger slidably received within said bore and defining a pressure chamber therebetween, said hollow plunger having inner walls and an upper end with an aperture, said inner walls defining an inner diameter of said hollow plunger;
    a piston spring biasing said hollow plunger in a protruding direction from said bore;
    a pressure relief valve assembly provided inside said chamber, said valve assembly having a valve housing comprising an inner chamber and a first valve housing aperture connecting said inner chamber of said valve housing to said pressure chamber such that fluid may flow between said pressure chamber and said inner chamber;
    said pressure relief valve assembly having a ball and a valve spring positioned inside said inner chamber biasing said ball against said first valve aperture, said ball allowing fluid to enter said inner chamber from said pressure chamber when the fluid pressure inside said pressure chamber reaches a predetermined value;
    said valve housing having a second valve aperture such that fluid from said inner chamber may flow from said inner chamber;
    a vent located adjacent to and integral with said valve housing, said vent having a radial diameter, said radial diameter being less than said plunger inner diameter to permit passage of fluid between said vent and said plunger inner wall, said vent including a disc having a first surface, a second surface, and a periphery and a channel formed on said first surface of said disc, said channel having a first end terminating at said periphery of said disc and a second end terminating in a central position of said first surface in a position to establish a connection between the atmosphere and said pressure relief valve through said aperture said passage of fluid being along the entire periphery of said vent.

2. The hydraulic chain tensioner of claim 1, wherein said periphery of said vent is formed with a groove extending in the axial direction and communicating with said channel of said vent.

3. The hydraulic chain tensioner of claim 1, wherein said vent channel has a tortuous path extending from said first end extending through said second end.

4. The hydraulic chain tensioner of claim 3, wherein said vent channel has a spiral shape.

5. The hydraulic chain tensioner of claim 3, wherein said first end of said vent channel tapers toward a tip of said first end.

6. The hydraulic chain tensioner of claim 1, wherein said pressure relief valve and vent are biased against the inside of said upper end of said plunger by said piston spring.

7. The hydraulic chain tensioner of claim 1, further comprising a fluid passage provided in said housing to connect said chamber with an external source of pressurized fluid.

8. The hydraulic chain tensioner of claim 7, wherein a check valve is provided between said chamber and said external source of pressurized fluid to permit fluid flow into said chamber while blocking fluid flow in the reverse direction.

* * * * *